United States Patent
Sugano et al.

(10) Patent No.: US 8,069,951 B2
(45) Date of Patent: Dec. 6, 2011

(54) INSTALLATION STRUCTURE OF OIL COOLER OF VEHICULAR TRANSMISSION

(75) Inventors: Taku Sugano, Shizuoka (JP); Tsutomu Saitou, Kanagawa (JP)

(73) Assignee: Jatco Ltd, Fuji-shi (JP)

( * ) Notice: Subject to any disclaimer, the term of this patent is extended or adjusted under 35 U.S.C. 154(b) by 1101 days.

(21) Appl. No.: 11/239,464

(22) Filed: Sep. 30, 2005

(65) Prior Publication Data

US 2006/0070811 A1    Apr. 6, 2006

(30) Foreign Application Priority Data

Oct. 1, 2004 (JP) ................................. 2004-289629

(51) Int. Cl.
*F01M 1/04* (2006.01)
*F28F 13/12* (2006.01)

(52) U.S. Cl. .......... 184/6.5; 184/6.21; 165/119; 165/51; 165/916; 60/336; 475/161

(58) Field of Classification Search .................. 184/6.5, 184/6.21; 165/119, 51, 916; 60/336; 475/161
See application file for complete search history.

(56) References Cited

U.S. PATENT DOCUMENTS

| | | | | |
|---|---|---|---|---|
| 2,782,658 A | * | 2/1957 | Schaefer et al. ................. | 477/54 |
| 3,273,384 A | * | 9/1966 | Flaugher ..................... | 73/115.02 |
| 4,238,929 A | * | 12/1980 | Fujioka ............................. | 60/336 |
| 4,903,798 A | * | 2/1990 | Takemoto et al. ............ | 184/6.24 |
| 5,014,741 A | * | 5/1991 | Taguchi ....................... | 184/6.12 |
| 5,273,492 A | * | 12/1993 | Kashiwase et al. ............. | 474/43 |
| 6,183,391 B1 | * | 2/2001 | Iijima .............................. | 477/62 |
| 6,227,333 B1 | * | 5/2001 | Scheib et al. ................. | 184/6.22 |
| 6,508,211 B1 | * | 1/2003 | Asano .......................... | 123/41.1 |
| 6,511,396 B1 | | 1/2003 | Tanizawa et al. | |
| 6,520,293 B1 | * | 2/2003 | Ogawa et al. ................. | 184/6.22 |
| 2002/0007982 A1 | * | 1/2002 | Howard ......................... | 184/6.2 |
| 2003/0205432 A1 | * | 11/2003 | Mills et al. ..................... | 184/1.5 |
| 2004/0040767 A1 | * | 3/2004 | Yamamoto .................... | 180/190 |
| 2005/0217830 A1 | | 10/2005 | Matsubara et al. | |

FOREIGN PATENT DOCUMENTS

| | | | |
|---|---|---|---|
| JP | 6-108845 A | | 4/1994 |
| JP | 2002-054724 A | | 2/2002 |
| JP | 2003-106415 A | | 4/2003 |
| JP | 2003106419 | * | 9/2003 |
| JP | 2004-183671 A | | 7/2004 |
| JP | 2004-197904 A | | 7/2004 |

* cited by examiner

*Primary Examiner* — Bradley King
*Assistant Examiner* — Mahbubur Rashid
(74) *Attorney, Agent, or Firm* — Foley & Lardner LLP

(57) ABSTRACT

In an oil cooler installation structure for a vehicular transmission, an oil cooler by means of which oil is cooled is provided, oil being delivered between the oil cooler and an internal of a transmission housing, and an oil cooler installation portion is provided in the internal of the transmission housing and in which a first oil passage for supplying oil in the internal of the transmission housing to the oil cooler via a first opening portion opened at an external of the transmission housing and a second oil passage for supplying oil from the oil cooler to the internal of the transmission housing via a second opening portion opened at the external of the transmission housing are formed, the oil cooler being attached onto the oil cooler installation portion to enable a delivery of oil via the first opening portion and the second opening portion.

10 Claims, 6 Drawing Sheets

INSTALLATION STRUCTURE OF OIL COOLER OF VEHICULAR TRANSMISSION

BACKGROUND OF THE INVENTION

The present invention relates to an installation structure of an oil cooler of a vehicular transmission which carries out a delivery of an oil between the transmission and the oil cooler.

Such a kind of technique as described above is disclosed in a Japanese Patent Application First Publication No. Heisei 6-108845 published on Apr. 19, 1994. In the above-described Japanese Patent Application First Publication No. Heisei 6-108845, the oil cooler is installed in a proximity to a radiator which is remote from the transmission, an oil feed pipe is interlinked between the transmission and the oil cooler, and an oil cooling is carried out with a coolant supplied from the radiator to an engine, and the cooled oil is supplied to the transmission via the oil feed pipe.

SUMMARY OF THE INVENTION

However, since, in the above-described technique, the oil feed pipe is installed between the oil cooler and the transmission housing, it is necessary to secure a piping space within a narrow engine compartment. In addition, at least four of connecting portions among the oil feed pipe, the oil cooler, and a transmission housing are needed. Furthermore, a secured linkage to prevent an oil leakage from linkage portions of the oil feed pipe and its confirmation are needed. Consequently, problems of a worsening of the workability during the assembly of the oil cooler and an introduction of an increase in a working labor hour are raised.

It is, therefore, an object of the present invention to provide an installation structure of an oil cooler of a vehicular transmission which is capable of reducing the piping space to deliver the oil, reducing the oil cooler installation labor hour, and improving a workability.

According to one aspect of the present invention, there is provided with an oil cooler installation structure for a vehicular transmission, comprising: an oil cooler by means of which oil is cooled; an internal of a transmission housing in which a gear shift mechanism is housed, oil being delivered between the oil cooler and the internal of the transmission housing; and an oil cooler installation portion provided in the internal of the transmission housing and in which a first oil passage for supplying oil in the internal of the transmission housing to the oil cooler via a first opening portion opened at an external of the transmission housing and a second oil passage for supplying oil from the oil cooler to the internal of the transmission housing via a second opening portion opened at the external of the transmission housing are formed, the oil cooler being attached onto the oil cooler installation portion to enable a delivery of oil via the first opening portion and the second opening portion.

This summary of the invention does not necessarily describe all necessary features so that the present invention may also be a sub-combination of these described features.

DETAILED DESCRIPTION OF THE INVENTION

Reference will hereinafter be made to the drawings in order to facilitate a better understanding of the present invention.

Figure 1:
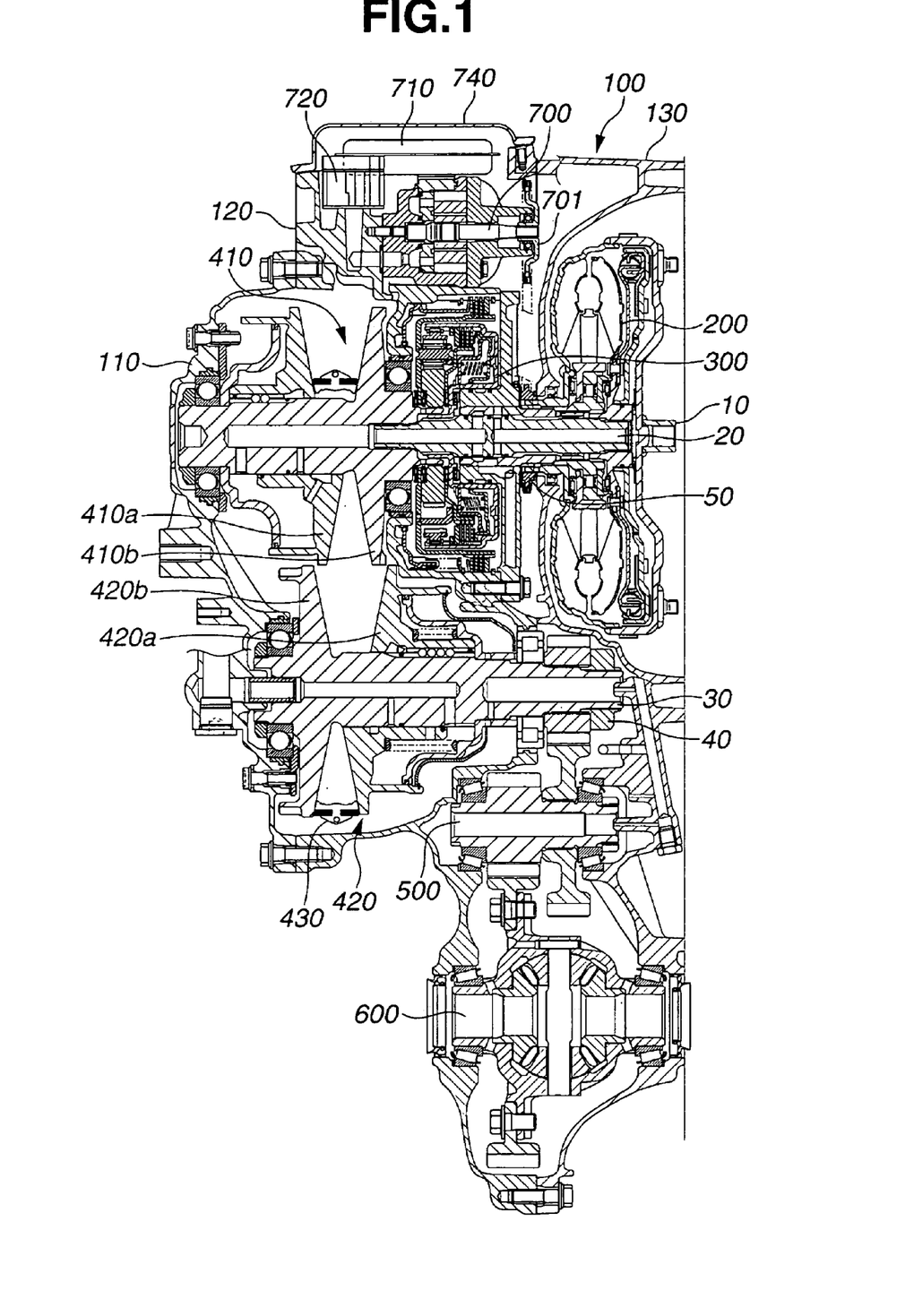
FIG. 1 is a schematic cross sectional view of an automatic transmission to which an installation structure of an oil cooler of a vehicular transmission in a preferred embodiment according to the present invention is applicable.

FIG. 1 shows a rough cross sectional view of an automatic transmission to which an oil cooler installation structure of in a preferred embodiment according to the present invention is applicable. A transmission housing 100 includes a first housing 110, a second housing 120, and a third housing 130. Within transmission housing 100, a torque converter 200 to amplify a torque from an engine, a forward-and-backward (run) switching mechanism 300 having a start (forward) clutch, a belt type continuously variable transmission 400 which continuously variably transmits the input torque to output torque between input and output thereof, an idler gear 500, and a differential gear 600. In addition, a mechanism to supply a pressurized oil and a lubricating oil to each device includes: an oil strainer 710, a control valve unit 720, and an oil cooler 730 (refer to FIG. 2). It is noted that torque converter 200, forward-and-backward switching mechanism 300, belt type continuously variable transmission 400, idler gear 500, and a differential gear 600 correspond to a gear shift mechanism according to the present invention.

Torque converter 200 is constituted by a pump impeller connected to an engine output axle 10, a turbine runner connected to a transmission input axle 20, a stator to arrange a flow of an internal working oil, and a lock-up clutch to directly transmit a power to driven wheels during a high speed travel of the vehicle.

Forward-and-backward switching mechanism 300 is constituted by a planetary gear mechanism having a sun gear linked to the engine and having the forward clutch, a carrier linked to a backward brake, a ring gear linked to a primary pulley 410 and having a forward clutch. It is noted that planetary gear mechanism may be a single pinion type or double pinion type planetary gear or any arbitrary planetary gear.

Belt type continuously variable transmission 400 is constituted by a primary pulley 410 which is revolved in a unit with a revolution inputted from forward-and-backward switching mechanism 300 (movable pulley 410a and a stationary pulley 410b), a secondary pulley 420 (movable pulley 420a and stationary pulley 420b) revolved in a unit with the driven wheels at a predetermined speed reduction ratio, and a belt 430 wound over a groove of each pulley. An output gear 40 is fixed onto an end portion of a secondary pulley axle 30 installed on secondary pulley 30.

Two pinions of differential gear 600 are fixed on idler gear 500 and side gears are meshed with these pinions from left and right sides. A drive shaft is linked to each side gear and left and right driven wheels are driven by means of the drive shafts.

Vane pump 700 is constituted by a rotor, a cam ring eccentrically attached to this rotor, and a vane to partition an oil chamber defined by the rotor and the cam ring. The vane is fitted into a groove of the rotor and, at its inner side, the working oil supplied to the center axle of the rotor and an oil passage installed on each groove presses the vane toward a cam ring due to a centrifugal force acted during the revolution of rotor. This structure can reduce the number of parts and can improve a life as compared with a case where the vane presses the spring on the cam ring. An end of the rotor toward torque converter 200 is fixed with a driven sprocket 701 and is linked to a drive sprocket 50 which is revolved in a unit with an input axle 20 of transmission 100 via a chain 51.

An oil strainer 710 is installed at a suction inlet side of a vane pump 700 and a control valve unit 720 is installed at a drainage outlet side of vane pump 700. Electronic parts 721 such as a plurality of electromagnetic control valves and various types of sensors (oil temperature sensors and liquid pressure sensors) are disposed on an upper surface of control valve unit 720.

A coolant chamber to which a coolant is supplied and a lubricating oil chamber to which the lubricating oil is supplied are adjoined to one another and constructed in a laminated form, alternately, within an internal of oil cooler 730. The coolant chamber of oil cooler 730 is connected with a water feed water passage 731 for the cooling water from oil cooler 730 to be supplied to the engine and with a supply water passage 732 to which the coolant cooled by means of the radiator is supplied. In addition, the lubricating oil chamber of oil cooler 730 is connected with a supply oil passage 123 to which a high temperature lubricating oil is supplied and with an exhaust oil passage 124 to exhaust the lubricating oil exhausted via oil filter 750 as will be described later. It is noted that supply oil passage 123 and exhaust oil passage 124 correspond to a first oil passage and a second oil passage, respectively, in the case of the present invention.

Supply oil passage 123 is formed within second housing 120 and communicates with control valve unit 720, an oil pan 740, and an oil cooler 730. In addition, exhaust oil passage 124 is similarly formed within second housing 120 and is communicated with each device of belt type continuously variable transmission 400.

[Arrangement of Each Device within Transmission Housing]

Figure 2:
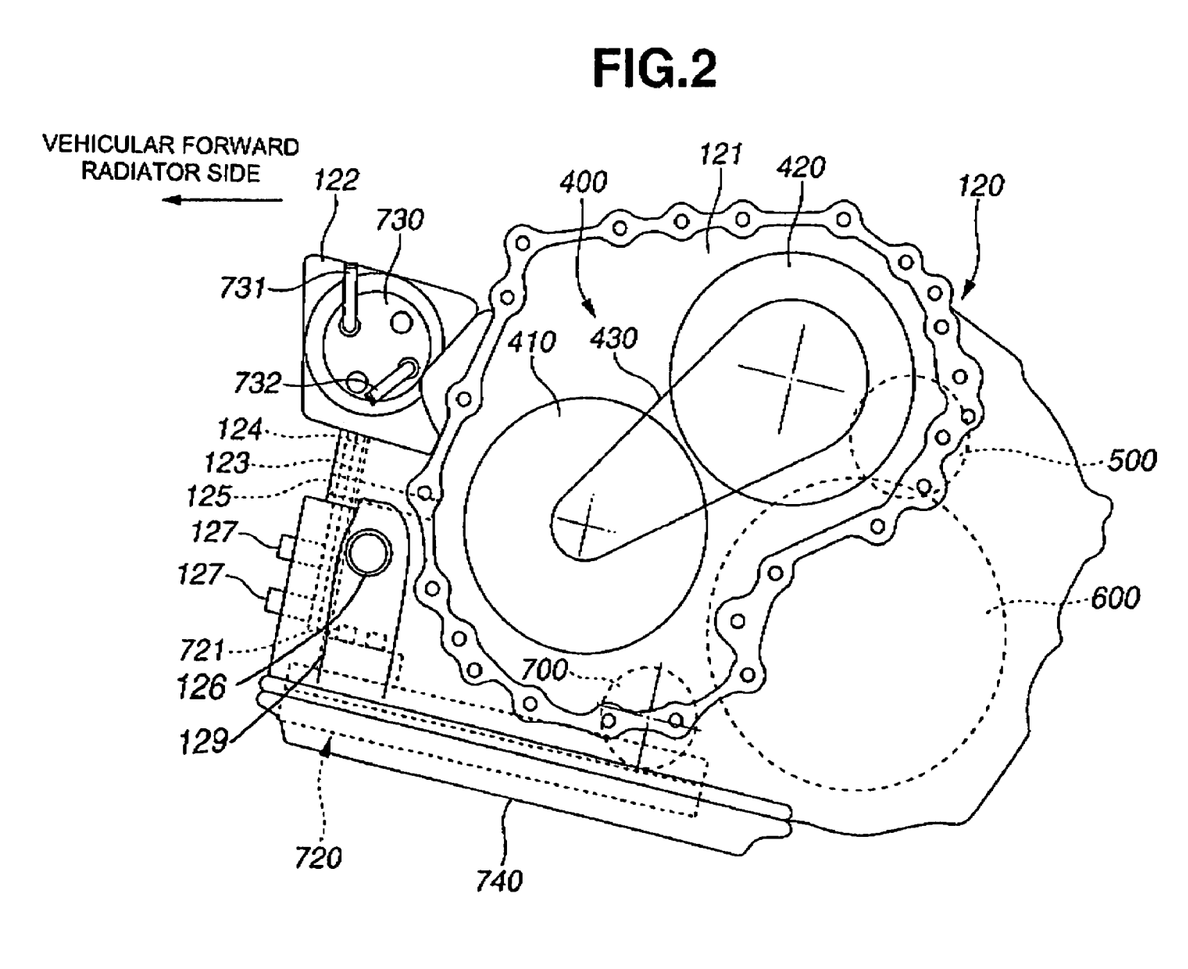
FIG. 2 is a schematic view of a second housing of a transmission housing viewed from a first housing thereof for explaining the installation structure of the oil cooler in the preferred embodiment according to the present invention.
Figure 3:
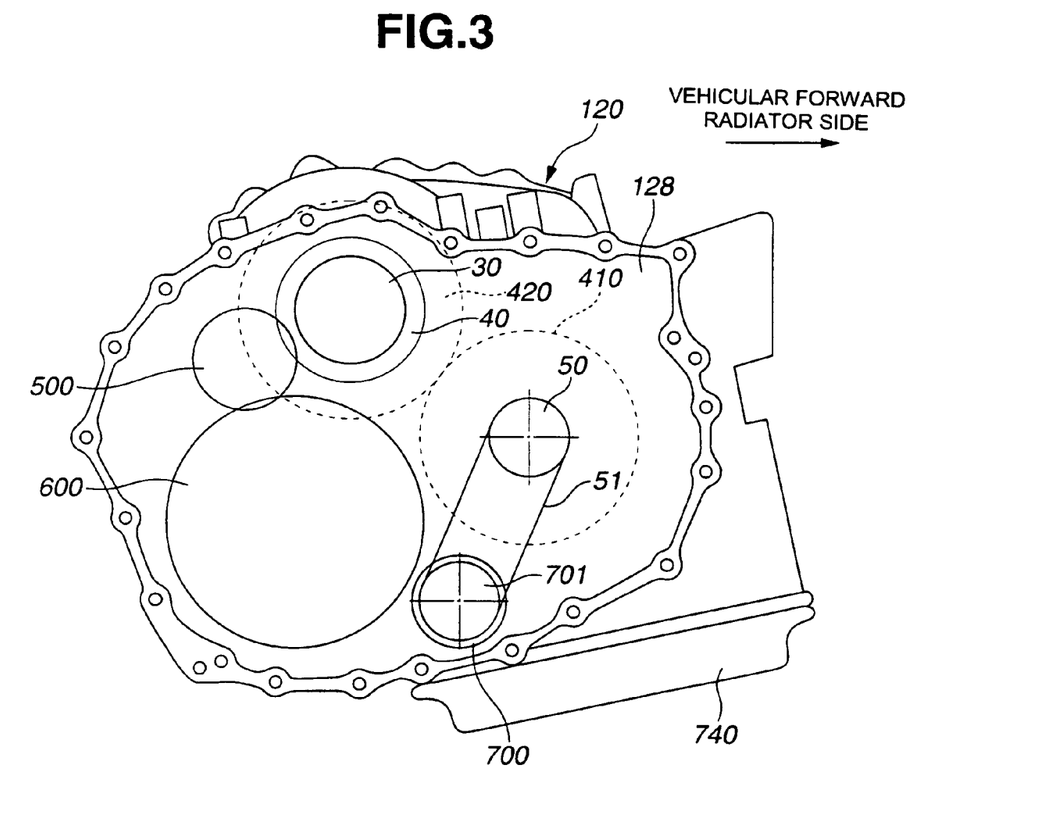
FIG. 3 is a schematic view of the second housing viewed from a third housing for explaining the installation structure of the oil cooler in the preferred embodiment according to the present invention.
Figure 4:
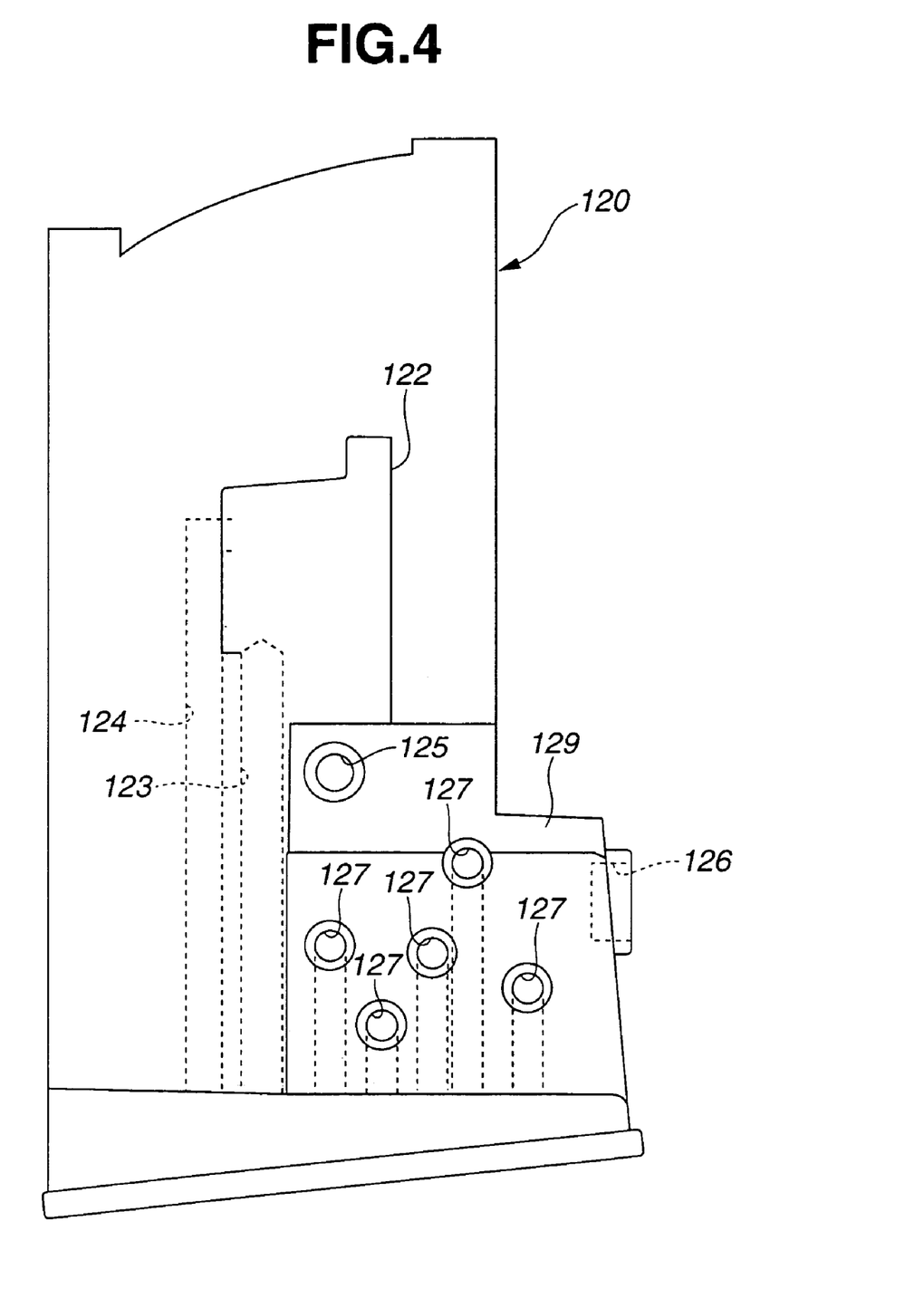
FIG. 4 is a schematic view of the second housing viewed from a vehicular forward side when it is actually mounted in the vehicle for explaining the installation structure of the oil cooler in the preferred embodiment according to the present invention.

FIG. 2 shows a rough view of second housing viewed from first housing 110, FIG. 3 shows a rough view of second housing 120 viewed from third housing 130, and FIG. 4 shows a rough view of second housing 120 viewed from the forward direction of second housing shown in FIGS. 2 and 3. In FIGS. 2 and 3, belt type continuously variable transmission 400, idler gear 500, differential gear 600, vane pump 700 are schematically represented by circles. In addition, circles denoted by broken lines in FIGS. 2 and 3 are housed with a wall partitioned at the opposite side thereof.

As shown in FIG. 2, belt type continuously variable transmission 400 is housed within a first housing chamber 121. Primary pulley 410 of belt type continuously variable transmission 400 is housed on a lower part of a front side of first housing chamber 121. A secondary pulley 420 is housed on an upper part of a rear side of first housing chamber 121. In addition, a lower part of fist housing 121 is opened and a lubricating oil lubricated for each device is exhausted from this opening portion to oil pan 740.

Control valve unit 720 and electronic parts 721 are housed within a third housing chamber 129 projected toward a front side of second housing 120. Third housing chamber 129 is formed with a harness inserting hole 126 into which harness to be connected to electronic parts 721 is inserted is formed. It is noted that third housing chamber 129 corresponds to a control valve unit housing portion according to the present invention.

A plurality of check oil passages 127 to supply the pressurized oil to a tester 60 to perform a check in the hydraulic pressure developed in control valve unit 720 during a product check are formed. A plurality of check oil passages 127 (third oil passages) are mutually adjacently formed and, furthermore, supply oil passages 123 and exhaust oil passage 124 are adjacently formed to check oil passages 127. Opening portions at control valve unit 720 side to check oil passage 127, supply oil passage 123, and exhaust oil passage 124 are precisely worked by means of a post working to maintain a liquid sealing ability between these oil passages and control valve unit 720. It is noted that check oil passage 127 corresponds to a third oil passage according to the present invention.

An oil cooler installation portion 122 on which oil cooler 730 is installed is integrally formed with second housing 120 on an upper portion of third housing portion 129 and check oil passage 127. Oil cooler installation portion 122 is formed on the upper portion toward which third housing 129 is projected, as shown in FIGS. 2 and 4. In addition, oil cooler installation portion 122 is arranged at the radiator side when second housing 120 is mounted on the vehicle in order to shorten the piping between a supply water passage 731 to supply the coolant and the radiator.

A revolution speed sensor inserting hole 125 into which a revolution sensor for primary pulley 410 is inserted is formed between third housing portion 129 and oil cooler installation portion 122.

As described above, the parts related to control valve unit 720 are concentrated and arranged at the lower portion and the parts related to oil cooler 730 are concentrated and arranged at the upper portion.

At torque converter 200, idler gear 500, differential gear 600, and vane pump 700 are housed in second housing portion 128, as shown in FIG. 3.

Differential gear 600 is housed in a lower part of a rear side of second housing 128. Idler gear 500 is arranged so as to be meshed with an output gear fixed to a secondary pulley 30 and differential gear 600.

[Structure Surrounding the Oil Cooler]

Figure 5:
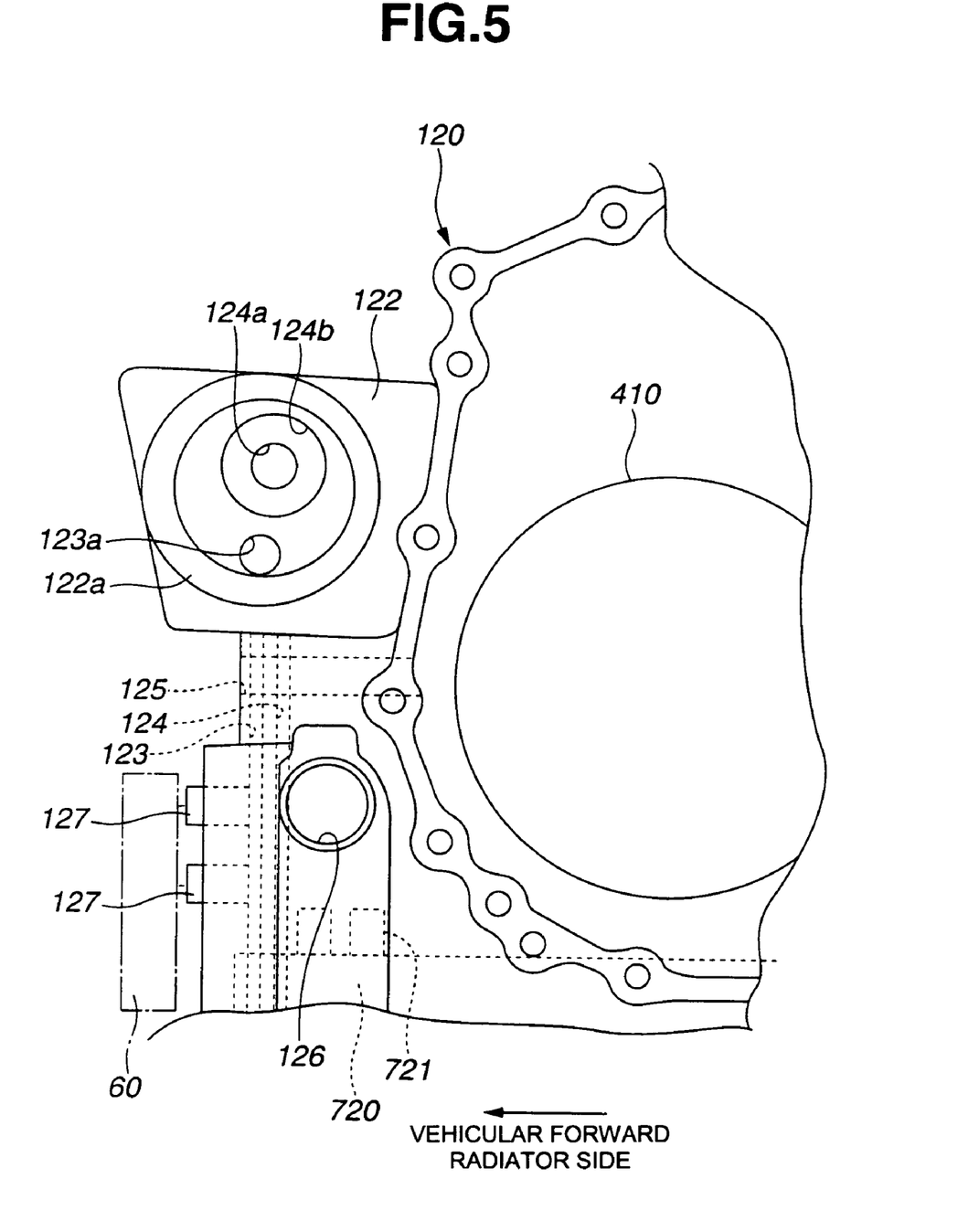
FIG. 5 is an expanded view of an oil cooler installation portion for explaining the installation structure of the oil cooler in the preferred embodiment according to the present invention.
Figure 6:
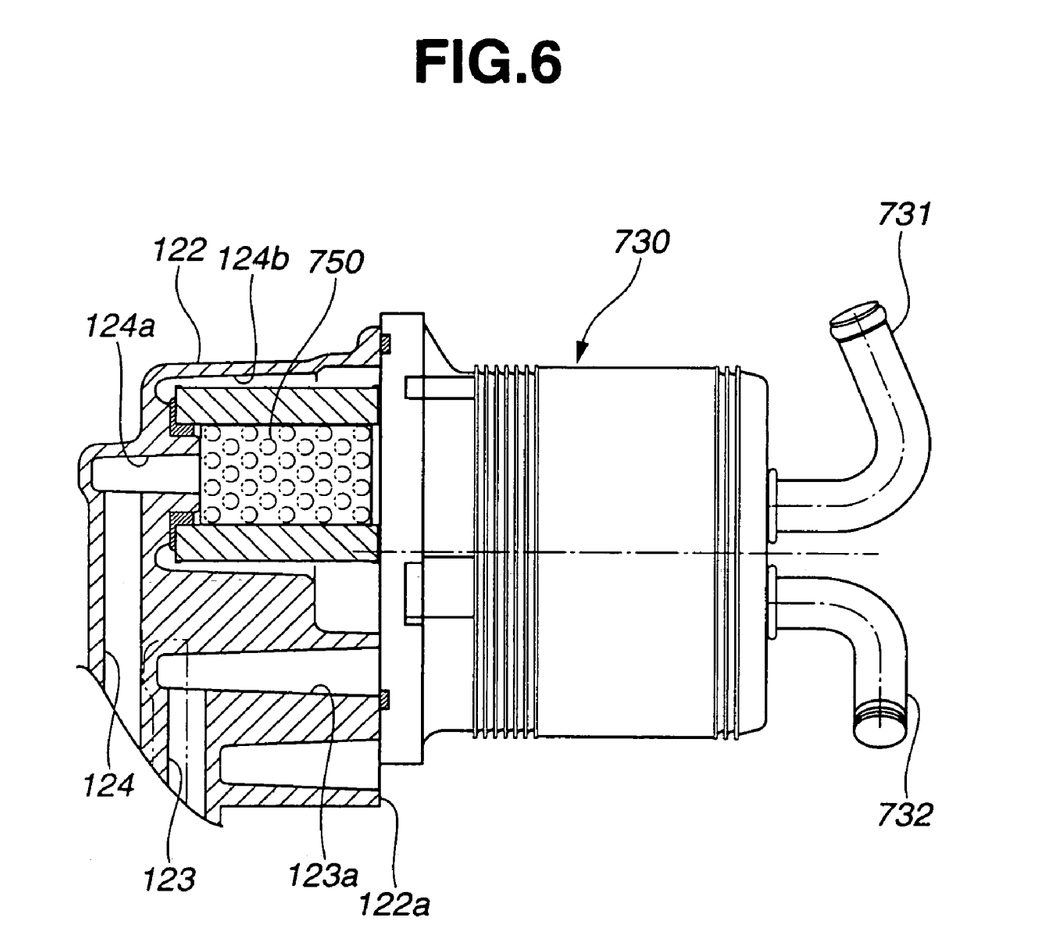
FIG. 6 is a cross sectional view of the oil cooler installation portion for explaining the installation structure of the oil cooler in the preferred embodiment according to the present invention.

FIG. 5 is an expanded view of oil cooler installation portion 122 viewed from first housing 110 and FIG. 6 shows a partial cross sectional view of oil cooler installation portion 122 shown in FIG. 4 and an expanded view of oil cooler 730.

As shown in FIG. 5, oil cooler installation portion 122 is formed with a flat oil cooler installation surface 122a to attach oil cooler 730. In addition, a supply oil passage open portion 123a opened to a surface of oil cooler installation portion 122a and communicated with oil supply passage 123 and opened to the surface of oil cooler installation portion 124a communicated with exhaust oil passage 124. Furthermore, a filter inserting portion 124b having a larger diameter than exhaust oil passage opening portion 124a is formed on exhaust oil passage opening portion 124a.

Filter 750 is not integrally formed within oil cooler 730 as shown in FIG. 6 but extended externally from oil cooler 730. Filter 750 is removably inserted into a filter inserting portion 124b formed in the internal of oil cooler installation portion

122. A lubricating oil chamber of oil cooler 730 is attached on supply oil opening portion 123a and supply oil passage opening portion 124a so as to enable supply and receipt (delivery) of the lubricating oil.

Next, an action will be described below.

[Action of Hydraulic Circuit]

When the engine is driven, a driving force is transmitted to driven sprocket 701 via drive sprocket 50 and chain 51 installed on transmission input axle 20 so that vane pump 700 is driven. When vane pump 700 is driven, the oil stored in oil pan 740 is supplied to vane pump 700 after its foreign matter is removed from oil strainer 720. Vane pump 700 develops a hydraulic pressure from the oil supplied thereto and supplies the hydraulic pressure to control valve unit 720. Control valve unit 720 adjusts the hydraulic pressure of the oil and supplies the working oil to each device. Oil cooler 730 sucks the oil which is not supplied to each device and the oil stored in oil pan 740. The sucked oil is supplied to the lubricating oil chamber, the oil in the lubricating oil chamber is cooled by means of the coolant in the coolant chamber adjoined to the lubricating oil chamber via a partitioning wall, and, thereafter, the foreign matter in the lubricating oil filter 750 installed on filter inserting portion 124b of oil cooler 730 is removed and supplied to each device.

[Action of Drive System]

Torque converter 200 augments the torque transmitted from the engine during a low vehicle speed and engages the lock-up clutch during the high vehicle speed during a high vehicle speed to transmit the driving force from the engine to forward-and-backward switching mechanism 300. In forward-and-backward switching mechanism 300, the inputted revolution is directly outputted with the sun gear and ring gear integrally engaged by means of the forward clutch during the forward travel. On the other hand, during the backward run of the vehicle, the backward brake fixes the carrier of forward-and-backward switching mechanism 300 to second housing 120 so as to reduce and output the inputted revolution in the reverse revolution.

In belt type continuously variable transmission mechanism 400, a cylinder chamber to modify a groove width by means of the magnitude of the hydraulic pressure is disposed on a back surface of each movable pulley of primary pulley 410 and secondary pulley 420. By controlling a propelling force in a direction of a rotary axle pressing belt 430, an effective winding radius of belt 430 is modified and a gear shift in an unlimited stage can be achieved.

The driving force shifted by belt type continuously variable transmission 400 is transmitted to drive wheels via output gear 40, idler gear 500, and differential gear 600.

Next, advantages of the oil cooler installation structure of the transmission in the preferred embodiment will be described below.

(1) In transmission casing 100, supply oil passage 123 and supply oil passage opening portion 123a to supply the oil to oil cooler 730 and exhaust oil passage 124 and exhaust oil passage opening portion 124a to exhaust the oil from oil cooler 730 are formed. In addition, oil cooler 730 is attached onto oil cooler installation portion 122 so as to enable the supply and receipt of the oil via supply oil passage opening portion 123a and supply oil passage opening portion 124a. Thus, it is not necessary to connect transmission housing 100 with supply oil passage 123 and exhaust oil passage 124. Hence, a workability during the assembly of oil cooler 730 can be improved, a reduction in the working labor hour, and a reduction in the piping space can be achieved. In addition, a reduction in the piping portion can achieve a light weight of the whole transmission.

(2) Filter 750 is not integrally formed within oil cooler 730 but is extended externally and is inserted into filter inserting portion 124b which is communicated with exhaust oil passage 124. Hence, it is not necessary to provide a filter space within oil chamber 730 and a small sizing of oil cooler 730 can be achieved.

(3) since filter 750 is removably inserted into filter inserting portion 124a, the workability during the exchange in filter 750 can be improved. It is noted that the term of removably represents that enabled to be taken out of.

(4) Since oil cooler installation portion 122 is disposed on the upper portion of third housing chamber 129 projected within second housing 120, a large sizing of transmission housing 100 due to the installation of oil cooler installation portion 122 can be suppressed to minimum.

(5) Third housing 129 and oil cooler installation portion 122 are formed at the vehicular front portion when transmission housing 100 is mounted on the vehicle, namely, toward the radiator side. Hence, both of water feed passage 731 and supply water passage 732 to feed the coolant between the radiator and oil cooler 730 can be shortened and a loss of a cooling efficiency can be reduced.

(6) Since supply oil passage 123, exhaust oil passage 124, and check oil passage 127 are mutually adjacently arranged, opening portions of respective oil passages located at control valve unit 720 can once be worked. Thus, the workability can be improved.

(7). Since a plurality of check oil passages 127 are adjacently arranged, a tester 60 can be inserted into check oil passages 127 through a single direction, the workability during the checking can be improved.

(8) Since transmission housing 100 and oil cooler installation portion 122 are integrally formed, the rigidity of transmission housing 100 can be increased.

(9) Since control valve unit 720 and check oil passage 127 are concentrated and arranged on the lower portion, check oil passages 127 can be shortened. The loss in the hydraulic pressure when the hydraulic pressure of the control valve is checked can be reduced so that a more accurate check can be made.

This application is based on a prior Japanese Patent Application No. 2004-289629 filed in Japan on Oct. 1, 2004, the disclosure of which is hereby incorporated by reference.

Although the invention has been described above by reference to certain embodiments of the invention, the invention is not limited to the embodiments described above. Modifications and variations of the embodiments described above will occur to those skilled in the art in light of the above teachings. For example, although, in the preferred embodiment, the three members of first housing 110, second housing 120, and third housing 130 constitute transmission housing 100, transmission housing may be constituted by a multiple number of members. In the preferred embodiment, the oil cooler is installed on the oil cooler installation portion formed on the transmission housing of the belt type continuously variable transmission. The present invention is applicable to a multiple geared automatic transmission, a toroidal continuously variable transmission, or any other type of the transmission in which the shift mechanism within transmission housing is lubricated with oil. The scope of the invention is defined with reference to the following claims.

What is claimed is:

1. An oil cooler installation structure for a vehicular transmission, comprising:
 an oil cooler by means of which oil is cooled;
 an internal of a transmission housing in which a gear shift mechanism is housed, oil being delivered between the oil cooler and the internal of the transmission housing and the gear shift mechanism having at least one rotary member;

an oil cooler installation portion provided in the internal of the transmission housing and in which a first oil passage for supplying oil in the internal of the transmission housing to the oil cooler via a first opening portion opened at an external of the transmission housing and a second oil passage for supplying oil from the oil cooler to the internal of the transmission housing via a second opening portion opened at the external of the transmission housing are formed; and a control valve unit housing portion configured to house at least one part of a control valve unit and electronic parts comprising a plurality of electromagnetic control valves and sensors, wherein the control valve unit housing portion projects from a vehicle forward side end of the gear shift mechanism toward the vehicle forward side and is formed at a position which provides the vehicular forward side of the transmission housing when the transmission is mounted on a vehicle, wherein the oil cooler is attached onto the oil cooler installation portion to enable a delivery of oil via the first opening portion and the second opening portion and the oil cooler is disposed on the vehicular forward side of the transmission housing and above a part of the control valve unit housing portion projected toward the vehicular forward side from the vehicle forward side end of the gear shift mechanism.

2. An oil cooler installation structure for a vehicular transmission as claimed in claim 1, wherein a filter to eliminate a foreign matter from oil is installed in the second oil passage of the oil cooler installation portion.

3. An oil cooler installation structure for a vehicular transmission as claimed in claim 2, wherein the filter is enabled to be inserted through and to be taken through the second opening portion into and out of the second oil passage.

4. An oil cooler installation structure for a vehicular transmission as claimed in claim 1, wherein the oil cooler installation portion is formed at a position which provides a vehicular forward side of the transmission housing when the transmission is mounted on the vehicle.

5. An oil cooler installation structure for a vehicular transmission as claimed in claim 1, wherein the transmission housing is provided with a third oil passage to feed oil from the control valve unit to a tester to check a hydraulic pressure developed at the control valve unit, the third oil passage being opened to the external of the transmission housing and being formed at a position adjacent to the first oil passage and the second oil passage.

6. An oil cooler installation structure for a vehicular transmission as claimed in claim 5, wherein a plurality of the third oil passages are arranged to be mutually adjacent to each other.

7. An oil cooler installation structure for a vehicular transmission as claimed in claim 1, wherein the transmission housing is integrally formed with the oil cooler installation portion.

8. An oil cooler installation structure for a vehicular transmission as claimed in claim 6, wherein the control valve unit and third oil passages are concentrated and arranged on a predetermined lower portion of the transmission housing.

9. An oil cooler installation structure for a vehicular transmission as claimed in claim 1, wherein the gear shift mechanism comprises a torque converter, a forward-and-backward switching mechanism, a continuously variable transmission, an idler gear, and a differential gear.

10. An oil cooler installation structure for a vehicular transmission as claimed in claim 1, wherein the first oil passage for supplying oil to the oil cooler is completely contained within a housing of the transmission.

\* \* \* \* \*